United States Patent
Matsunaga (10) Patent No.: US 10,077,985 B2
(45) Date of Patent: Sep. 18, 2018

(54) WIRELESS POSITIONING SYSTEM, WIRELESS POSITIONING TERMINAL, AND POINT INFORMATION TRANSMITTER

(71) Applicant: DENSO CORPORATION, Kariya, Aichi-pref. (JP)

(72) Inventor: Takayuki Matsunaga, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 20 days.

(21) Appl. No.: 15/525,082

(22) PCT Filed: Nov. 27, 2015

(86) PCT No.: PCT/JP2015/005923
§ 371 (c)(1),
(2) Date: May 8, 2017

(87) PCT Pub. No.: WO2016/088346
PCT Pub. Date: Jun. 9, 2016

(65) Prior Publication Data
US 2017/0336211 A1 Nov. 23, 2017

(30) Foreign Application Priority Data
Dec. 5, 2014 (JP) ................................ 2014-246886

(51) Int. Cl.
*G01C 21/20* (2006.01)
*G01S 19/10* (2010.01)
(Continued)

(52) U.S. Cl.
CPC ........... *G01C 21/206* (2013.01); *G01C 17/38* (2013.01); *G01S 19/10* (2013.01); *H04W 4/026* (2013.01); *H04W 88/02* (2013.01)

(58) Field of Classification Search
CPC ....... G01C 21/206; G01C 17/38; G01S 19/10; H04W 4/026; H04W 88/02
See application file for complete search history.

(56) References Cited

U.S. PATENT DOCUMENTS 3,274,488 A * 9/1966 Washkurak .......... G01R 33/025
324/244
6,081,230 A * 6/2000 Hoshino .............. G01C 21/165
342/357.32
(Continued)

FOREIGN PATENT DOCUMENTS

JP H08068643 A 3/1996
JP H10038602 A 2/1998
(Continued)

*Primary Examiner* — Mehmood B. Khan
(74) *Attorney, Agent, or Firm* — Harness, Dickey & Pierce, P.L.C.

(57) ABSTRACT

A wireless positioning system is provided which includes a point information transmitter and a wireless positioning terminal carried by a user to communicate wirelessly with the point information transmitter. The point information transmitter is installed at a predetermined installation position and transmits point information including at least magnetic correction information to correct a geomagnetic bias at the installation position. The wireless positioning terminal includes an orientation detector to detect an orientation based on geomagnetism and a correction section to correct the orientation detected by the orientation detector based on the magnetic correction information included in the point information received from the point information transmitter.

8 Claims, 5 Drawing Sheets

(51) Int. Cl.
  *G01C 17/38* (2006.01)
  *H04W 4/02* (2018.01)
  *H04W 88/02* (2009.01)

(56) References Cited

U.S. PATENT DOCUMENTS

| | | | | |
|---|---|---|---|---|
| 6,363,250 | B1* | 3/2002 | Lindell | G01C 17/26 342/357.31 |
| 2005/0183275 | A1* | 8/2005 | Kwon | G01C 17/30 33/361 |
| 2006/0217921 | A1* | 9/2006 | Kourogi | G01C 17/38 702/150 |
| 2007/0136020 | A1* | 6/2007 | Yasui | G01C 17/38 702/104 |
| 2007/0241744 | A1* | 10/2007 | Kusuda | G01C 17/38 324/244 |
| 2008/0108371 | A1 | 5/2008 | Alizadeh-Shabdiz et al. | |
| 2009/0088976 | A1* | 4/2009 | Ueda | G01C 17/00 701/472 |
| 2010/0312519 | A1* | 12/2010 | Huang | G01C 17/28 702/150 |
| 2011/0080841 | A1 | 4/2011 | Alizadeh-Shabdiz et al. | |
| 2011/0287783 | A1 | 11/2011 | Alizadeh-Shabdiz et al. | |
| 2012/0155770 | A1* | 6/2012 | Grzechnik | G01C 17/38 382/190 |
| 2013/0197891 | A1* | 8/2013 | Jessop | G06T 17/05 703/9 |
| 2013/0200882 | A1* | 8/2013 | Almalki | G01R 33/0035 324/202 |
| 2014/0329540 | A1* | 11/2014 | Duggan | H04W 4/02 455/456.1 |
| 2015/0042451 | A1* | 2/2015 | Matsumoto | G01C 21/165 340/5.61 |
| 2015/0087336 | A1 | 3/2015 | Alizadeh-Shabdiz et al. | |
| 2016/0187134 | A1* | 6/2016 | Kimishima | G01C 17/28 33/356 |
| 2016/0273915 | A1* | 9/2016 | Kitamura | G01D 3/022 |
| 2017/0066464 | A1* | 3/2017 | Carter | B60T 7/12 |

FOREIGN PATENT DOCUMENTS

| | | |
|---|---|---|
| JP | 2010509571 A | 3/2010 |
| JP | 2013185845 A | 9/2013 |

\* cited by examiner

| TIME PERIOD | MAGNETIC CORRECTION INFORMATION | FACTOR |
|---|---|---|
| □:□□～□:□□ (FIRST TIME PERIOD) | △△△ (FIRST PRESET VALUE) | NONE (NORMAL) |
| □:□□～□:□□ (SECOND TIME PERIOD) | × × × (SECOND PRESET VALUE) | TRANSIT OF TRAIN |
| □:□□～□:□□ (THIRD TIME PERIOD) | △△△ (FIRST PRESET VALUE) | NONE (NORMAL) |
| ... | ... | ... |

WIRELESS POSITIONING SYSTEM, WIRELESS POSITIONING TERMINAL, AND POINT INFORMATION TRANSMITTER

CROSS-REFERENCE TO RELATED APPLICATIONS

This application is a U.S. National Phase Application under 35 U.S.C. 371 of International Application No. PCT/JP2015/005923 filed on Nov. 27, 2015 and published in Japanese as WO 2016/088346 A1 on Jun. 9, 2016. This application is based on and claims the benefit of priority from Japanese Patent Application No. 2014-246886 filed on Dec. 5, 2014. The entire disclosures of all of the above applications are incorporated herein by reference.

TECHNICAL FIELD

The present disclosure relates to a technology of wireless communication-based positioning a wireless positioning terminal carried by a user.

BACKGROUND ART

A GPS (Global Positioning System) is conventionally available for a broad location-based service, which is provided to a portable device or the like such as a high-performance portable phone, namely so-called a smartphone. It is known that a GPS is out of service indoors or underground, however.

As a known method of identifying the position of a portable device indoors or underground where a GPS comes to be out of service, there is a self-contained navigation of obtaining a traveling trajectory of the portable device from a measured quantity of a distance sensor or an orientation sensor installed in the portable device and calculating a current position by adding the traveling trajectory to a start point. Patent Literature 1 proposes a technology of using a geomagnetic sensor to detect an orientation based on geomagnetism as an orientation sensor in self-contained navigation.

PRIOR ART LITERATURE

Patent Literature

Patent Literature 1: JP H10-38602A

SUMMARY OF INVENTION

By the above technology however, when an indoors or underground structure or a building uses a material having magnetic force, the influence of such magnetic force causes a geomagnetic sensor to hardly detect an accurate orientation sometimes. Meanwhile, the GPS is available in the outdoors the influence of magnetic force poses the same difficulty as is the case in the indoors or underground.

An object of the present disclosure is to provide a technology for detecting an orientation with a high degree of accuracy based on geomagnetism.

A wireless positioning system in an aspect of the present disclosure comprises a point information transmitter and a wireless positioning terminal carried by a user to communicate wirelessly with the point information transmitter. The point information transmitter is installed at a predetermined installation position and transmits point information including at least magnetic correction information to correct a geomagnetic bias at the installation position. The wireless positioning terminal includes an orientation detector to detect an orientation based on geomagnetism and a correction section to correct the orientation detected by the orientation detector based on the magnetic correction information included in the point information received from the point information transmitter.

According to such a wireless positioning system, the influence of the deviation of an orientation caused by a geomagnetic bias can be reduced. As a result, an orientation can be detected with a high degree of accuracy based on geomagnetism.

Further, a point information transmitter may transmit position information to identify an installation position as point information. As a result, a wireless positioning terminal can estimate a current position from the position information included in the point information by receiving the point information transmitted from the point information transmitter.

Furthermore, according to another aspect of the present disclosure, a point information transmitter installed in a wireless positioning system and a wireless portable terminal installed in the wireless positioning system are provided. These can constitute the above-described wireless positioning system and the above-described effects can be obtained accordingly.

Such a point information transmitter can constitute the above-described wireless positioning system and the above-described effects can be obtained accordingly.

BRIEF DESCRIPTION OF THE DRAWINGS

The above and other objects, features, and advantages on the present disclosure will be more apparent from the following detailed description made with reference to the accompanying drawings in which.

DESCRIPTION OF EMBODIMENTS

Embodiments are explained hereunder in reference to drawings.

(1. First Embodiment)
(1-1. Configuration)

Figure 1:
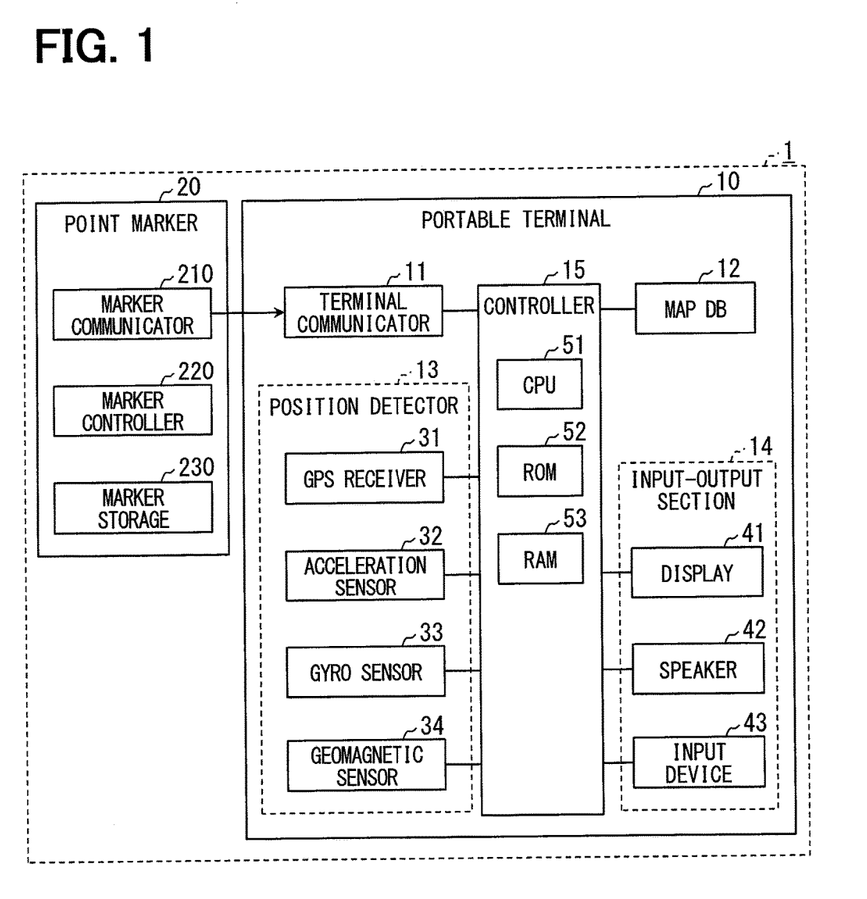
FIG. 1 is a block diagram showing a configuration of a positioning system according to a first embodiment.

A positioning system 1 shown in FIG. 1 is a system for identifying a position of a portable terminal 10 by wireless communication between a point marker 20 installed indoors and the portable terminal 10 portable by a user.

Figure 2:
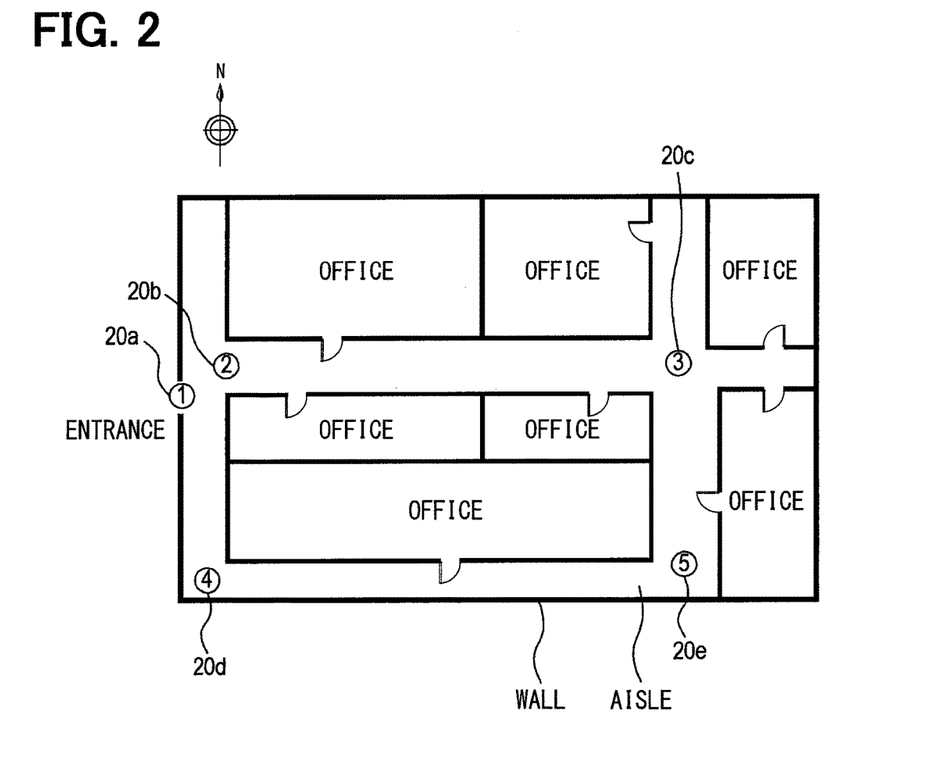
FIG. 2 is a diagram showing an arrangement example of point markers.

A plurality of point markers 20 are installed indoors at predetermined installation positions, for example at predetermined installation positions on a floor in a building as shown in FIG. 2. In the example shown in FIG. 2, point markers 20a to 20e are installed at an entrance and branches of an aisle respectively on a floor in a building. Here in the following explanations, a point marker is represented by adding a suffix like the point marker 20a when the point markers 20a to 20e have to be distinguished and point markers are collectively represented by eliminating suffixes like a point marker 20 when the point markers 20a to 20e are not required to be distinguished individually.

Back to FIG. 1 and the explanations are continued. Firstly, a configuration of a point marker 20 is explained. The point marker 20 has a marker communicator 210, a marker controller 220, and a marker storage 230.

The marker communicator 210 produces a transmission wave by modulating point information outputted from the marker controller 220 and applying frequency conversion to generate a predetermined frequency by a predetermined method and transmits the transmission wave into a predetermined transmission range. The transmission range means a range where a transmission wave having a strength allowing a portable terminal 10 to receive the transmission wave is transmitted. As an example in the present embodiment, a range within a radius dm around a point marker 20 is defined as a transmission range. In other words, a transmission wave is transmitted from the marker communicator 210 at such an output strength that makes the transmission range a range within a radius dm around a point marker 20. As an example in the present embodiment, a radius dm is set at about 1 m.

The marker controller 220 is an electronic device including a microcomputer having a CPU, a ROM, a RAM, and others, those being not shown in the drawings, and controls various operations of the point marker 20 based on a program stored in the ROM. In the present embodiment, the marker controller 220 perform controls so that point information is always output to the marker communicator 210 and a later-described transmission wave representing the point information is always transmitted from the marker communicator 210.

The marker storage 230 is a storage device in which point information is stored. The point information is information on an installation position where a point marker 20 is installed and includes position information and magnetic correction information. The position information is information representing an installation position. In the present embodiment, by way of example, the absolute coordinate of an installation position is stored as the position information in the marker storage 230.

The magnetic correction information is information representing a difference between a true absolute orientation at the installation position of a point marker 20 and a geomagnetic orientation. The geomagnetic orientation is an orientation detected by a geomagnetic sensor at the installation position. As well known, the geomagnetic sensor is a sensor to detect an absolute orientation based on geomagnetism. When an absolute orientation is detected by a geomagnetic sensor however, a geomagnetic orientation obtained as a result of detection by the geomagnetic sensor has an error.

The error is caused by the influence of a geomagnetic declination and a geomagnetic inclination at an installation position or by the influence of an ambient environment, an interfering wave, and the like at an installation position. In an interior or an underground in particular, when a material generating magnetic force is used in a structural member of a building, a fixture in a shop, or others, a large error may be caused very frequently. Information representing a difference between a true absolute orientation and a geomagnetic orientation at an installation position is therefore stored as magnetic correction information in the marker storage 230 for every point marker 20, namely at the installation position of every point marker 20. As an example in the present embodiment, a predetermined fixed value representing a difference between an absolute orientation and a geomagnetic orientation responding to the installation position of a point marker 20 is stored as magnetic correction information.

The configuration of a portable terminal 10 is explained hereunder. The portable terminal 10 is an electronic device having a positioning function to detect a position and is embodied as, for example, a high-performance portable phone, namely so-called a smartphone. The portable terminal 10 includes a terminal communicator 11, a map database (map DB) 12, a position detector 13, an input-output section 14, and a controller 15.

The terminal communicator 11 receives a transmission wave transmitted from a point marker 20, generates a baseband signal by applying frequency conversion and frequency demodulation, and outputs the generated baseband signal representing the point information to the controller 15.

The position detector 13 includes a GPS receiver 31, an acceleration sensor 32, a gyro sensor 33, and a geomagnetic sensor 34.

The map DB 12 is a storage device pre-storing map data representing a map. The map DB 12 stores map data representing a map of an interior where a point marker 20 is installed in addition to map data representing a map of an exterior.

The input-output section 14 includes a speaker 42 to output a voice, a display section 41 having a display to display an image, and an input device 43 to accept the operation of a user carrying the portable terminal 10.

The controller 15 is an electronic device including a microcomputer comprising a CPU 51, a ROM 52, a RAM 53, and others and carries out a process for implementing various functions of the portable terminal 10 in accordance with a program stored in the ROM 52. The controller 15 carries out a positioning process for positioning the portable terminal 10.

(1-2. Process)

Figure 3:
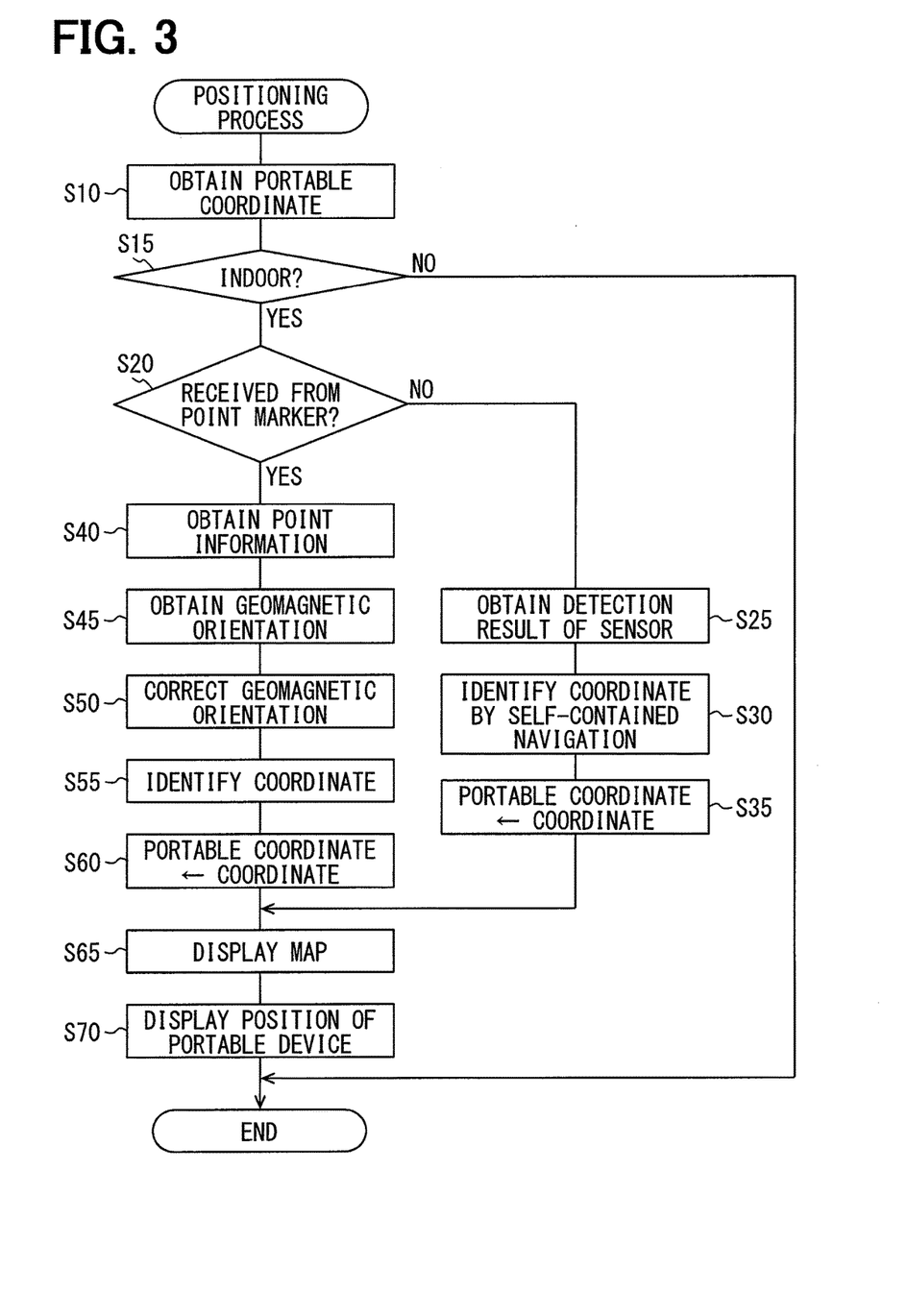
FIG. 3 is a flowchart of a positioning process carried out by a controller in a portable terminal.

A positioning process carried out by a CPU 51 in a controller 15 of a portable terminal 10 is explained hereunder in reference to the flowchart in FIG. 3. The positioning process is carried out repeatedly while the electric source of the portable terminal 10 is in the switched-on. As stated above, in the present embodiment, a transmission wave representing point information is transmitted always from a point marker 20. Here in the following explanations, when a subject is absent in a sentence, the controller 15 is the subject of the sentence.

Firstly at S (Step) 10, a portable coordinate representing a current position of the portable terminal 10 stored in a RAM 53 is obtained. In the RAM 53, a last (latest) past portable coordinate is stored and previous values are erased by overwriting or the like through the positioning process. Here, as an example in the present embodiment, an absolute coordinate of the portable terminal 10 is stored as a portable coordinate. In the following explanations, when a word "coordinate" is used, the word means an absolute coordinate.

At succeeding S15, whether or not the current position of the portable terminal 10 is an indoor position is determined. The process shifts to S20 when the current position is an indoor position and the positioning process is ended when the current position is not an indoor position. More specifically, whether or not a position represented by a portable coordinate is an indoor position is determined based on a portable coordinate obtained at S10 and a map stored in a map DB 12.

Successively at S20, whether or not a transmission wave is received from a point marker 20 is determined. The process shifts to S40 when the transmission wave is received and shifts to S25 when the transmission wave is not received. More specifically, a transmission wave is determined to be received from the point marker 20 when the intensity of the transmission wave from the point marker 20 received by a terminal communicator 11 is not lower than a predetermined value. Here in other words, that a transmission wave is received from the point marker 20 means that the portable terminal 10 is located within the transmission range of the point marker 20.

Successively at S25, the detection results of an acceleration sensor 32 and a gyro sensor 33 are obtained.

At succeeding S30, a coordinate of the portable terminal 10 is identified by self-contained navigation based on the detection results of the acceleration sensor 32 and the gyro sensor 33 obtained at S25, a portable coordinate obtained at S10, and a current orientation stored previously at S50. In other words, a coordinate of the portable terminal 10 is identified by using a portable coordinate obtained at S10 as a start point and adding, to the start point, a traveling trajectory obtained based on the number of steps of a user carrying the portable terminal 10 computed from a measured value (number of vibrations) of the acceleration sensor 32 and a measured value of the gyro sensor 33.

Successively at S35, the coordinate identified at S30 is stored (overwritten) as a portable coordinate in the RAM 53. Then the process shifts to S65.

Meanwhile, at S40 to which the process shifts when a transmission wave is received from the point marker 20, point information is obtained based on the received transmission wave.

At succeeding S45, a geomagnetic orientation is obtained by a geomagnetic sensor 34.

Successively at S50, the geomagnetic orientation is corrected. More specifically, the geomagnetic orientation obtained at S45 is corrected based on magnetic correction information included in the point information obtained at S40 and the corrected orientation is stored as a current orientation in the RAM 53.

At succeeding S55, a coordinate of the portable terminal 10 is identified.

More specifically, the coordinate represented by position information included in the point information obtained at S40 is identified as a coordinate of the portable terminal 10.

Successively at S60, the coordinate identified at S55 is stored (overwritten) as the portable coordinate in the RAM 53. Then the process shifts to S65.

At succeeding S65, a map is displayed on a display section 41. More specifically, a map is displayed on the display section 41 so that the current orientation identified at S50 may be directed toward the upper direction on the display section 41 in the portable terminal 10.

Successively at S70, the position of the portable terminal 10 is displayed on the map displayed on the display section 41 and the positioning process is ended.

(1-3. Effects)

According to the first embodiment described heretofore in detail, the following effects are obtained.

(1A) Point information includes magnetic correction information to correct a geomagnetic bias at an installation position of a point marker 20. In other words, point information includes magnetic correction information to correct a geomagnetic orientation detected by a geomagnetic sensor 34 in a portable terminal 10 located in a communicable range of the point marker 20 with a terminal communicator 11 in accordance with a geomagnetic bias at the installation position of the point marker 20. A controller 15 in the portable terminal 10 corrects the geomagnetic orientation detected by the geomagnetic sensor 34 based on the magnetic correction information included in the point information received from the point marker 20 and computes a current orientation. Orientation deviation caused by a geomagnetic bias can thereby be corrected and the orientation of the portable terminal 10 can accurately be identified indoors, underground, or the like. As a result, when a position of the portable terminal 10 is identified by self-contained navigation for example, the position of the portable terminal 10 can be identified with a high degree of accuracy.

Figure 4:
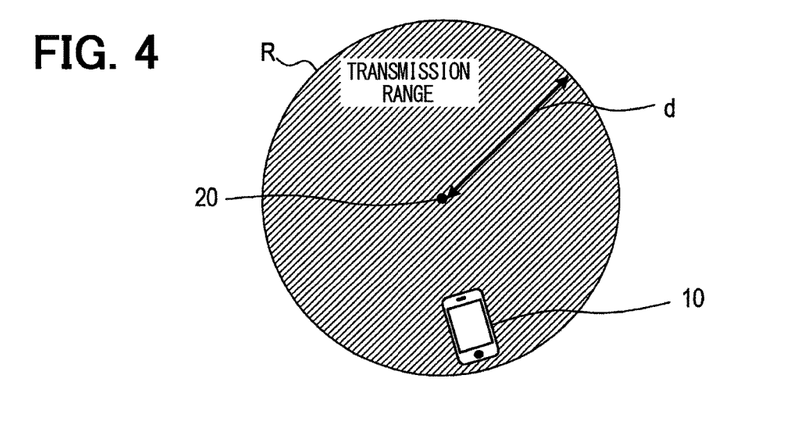
FIG. 4 is a diagram showing an example of locating a portable terminal in a transmission range of a point marker.

(1B) A transmission range of a point marker 20 is predetermined and a coordinate of the point marker 20 is identified as the coordinate of a portable terminal 10 when the portable terminal 10 is located at a position where the portable terminal 10 can receive a transmission wave from the point marker 20. As a result, when a range within a distance d (m) from the point marker 20 is defined as a transmission range R as stated earlier (refer to FIG. 4), the coordinate of the portable terminal 10 located within the transmission range R can be detected with an error of not larger than d (m). Further, by setting the transmission range R of the point marker 20, the detection accuracy of the location of the portable terminal 10 can be adjusted as needed. Here, the transmission range R shown in FIG. 4 is an example and the transmission range R is not limited to a round region.

Here, in the first embodiment, a positioning system 1 corresponds to an example of a wireless positioning system, a portable terminal 10 corresponds to an example of a wireless positioning terminal, a point marker 20 corresponds to an example of a point information transmitter, and a geomagnetic sensor 34 corresponds to an example of an orientation detector. Further, a controller 15 corresponds to an example of a correction section and a position identification section, S50 corresponds to an example of a process in the correction section, and S55 corresponds to an example of a process in the position identification section.

(2. Second Embodiment)

In a second embodiment, the basic configuration is similar to the first embodiment and hence the explanations on common configurations are omitted and explanations are made with a focus on the differences.

In the aforementioned first embodiment, a predetermined value is stored in a marker storage 230 as magnetic correction information. The second embodiment is different from the first embodiment on the point that, when a timing of changing a geomagnetic bias at an installation position is available, information to correct the geomagnetic bias in accordance with the timing is stored in a marker storage 230 as magnetic correction information.

Figure 5:
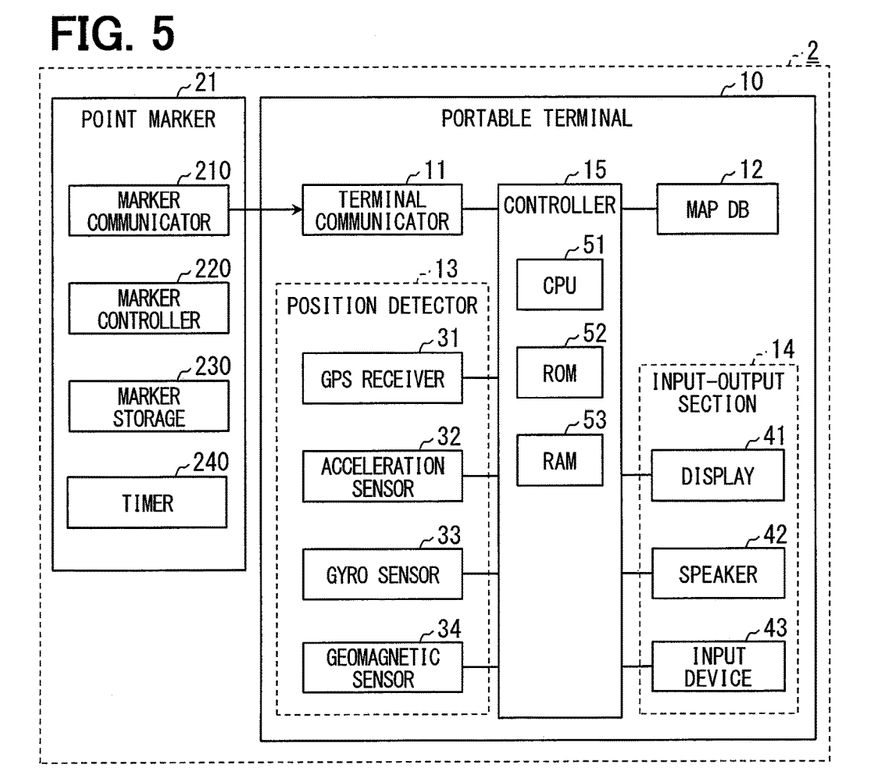
FIG. 5 is a block diagram showing a configuration of a positioning system according to a second embodiment.

More specifically, as shown in FIG. 5, in a positioning system 2 according to the present embodiment, a point marker 21 further includes a timer 240 to detect an absolute time, as compared with the point marker 20 in the positioning system 1. The timer 240 outputs the detected absolute time to a marker controller 220.

A marker storage 230 stores information to correct a geomagnetic bias in accordance with a timing of changing the geomagnetic bias at the installation position of the point marker 20 from a geomagnetic bias of normal time, as magnetic correction information. Examples of the timing of changing the geomagnetic bias at the installation position of the point marker 20 include a timing of an electric train running through the side of a building in the interior of which the point parker 20 is arranged. On this occasion, a timing of an electric train not running through the side of a building corresponds to normal time. In other words, a timing of changing a geomagnetic bias at an installation position from a geomagnetic bias at normal time is a predictable timing of changing the geomagnetic bias.

As stated above, in the case of an electric train running through the side of a building in the interior of which a point parker 20 is arranged, a value different from a value at normal time of an electric train not running through is stored in a marker storage 230 as magnetic correction information according to the time when the electric train passes through. More specifically, as the table shown in FIG. 6, a first predetermined value is stored as magnetic correction information for when an electric train does not pass through in a first time period and a third time period represented by absolute time, namely when the first and third time periods are time periods of not changing a geomagnetic bias. Further, a second predetermined value different from the first predetermined value is stored as magnetic correction information for when an electric train passes through in a second time period represented by absolute time, namely when the second time period is a time period of changing a geomagnetism. Here, when there is a predicable timing of changing a geomagnetic bias by the factors of various events other than the timing of an electric train passing through, magnetic correction information corresponding to such factors and timing may be stored in the marker storage 230.

A marker controller 220 transmits a transmission wave representing point information including magnetic correction information corresponding to an obtained absolute time to a marker communicator 210 based on the absolute time obtained from the timer 240 and the magnetic correction information stored in the marker storage 230.

According to the second embodiment described above in detail, the following effects are obtained in addition to the effects (1A) and (1B) of the first embodiment described above.

(2A) When a timing of changing a geomagnetic bias at an installation position is available, information to correct the geomagnetic bias according to the timing is stored in a marker storage 230 as magnetic correction information. A point marker 20: defines the magnetic correction information as a first predetermined value for the time when there is no change in the geomagnetic bias and as a second predetermined value when there is a change in the geomagnetic bias; and transmits either the first predetermined value or the second predetermined value according to the timing. A current orientation thereby can be computed with a higher degree of accuracy than the case of using a certain fixed value as the magnetic correction information for example. As a result, a portable terminal 10 can be positioned with a higher degree of accuracy.

Here, in the second embodiment, a position system 2 corresponds to an example of a wireless positioning system and a point marker 21 corresponds to an example of a point information transmitter.

(3. Other Embodiments)

Although the embodiments have heretofore been exemplified, embodiments are not limited to the above embodiments and can have various configurations.

Figure 7A:
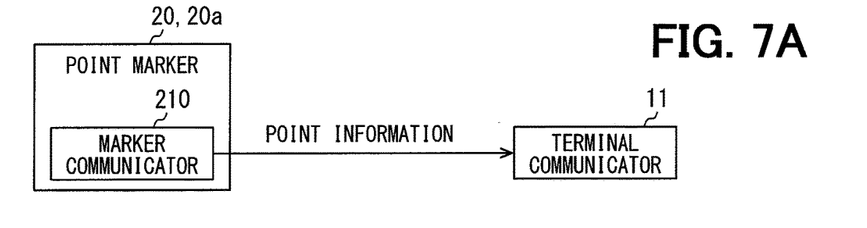
FIG. 7A is a diagram explaining a transmission mode of point information according to the first embodiment.
Figure 7B:
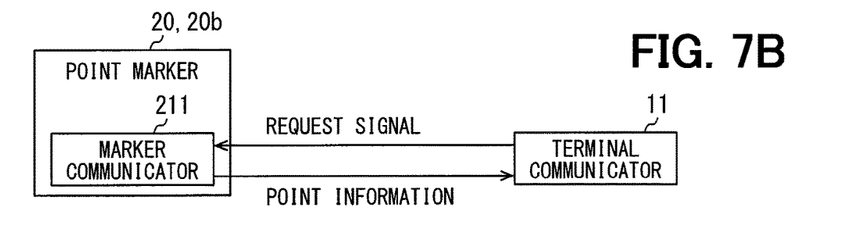
FIG. 7B is a diagram explaining a transmission mode of point information based on a request signal from a portable terminal according to another embodiment.
Figure 7C:
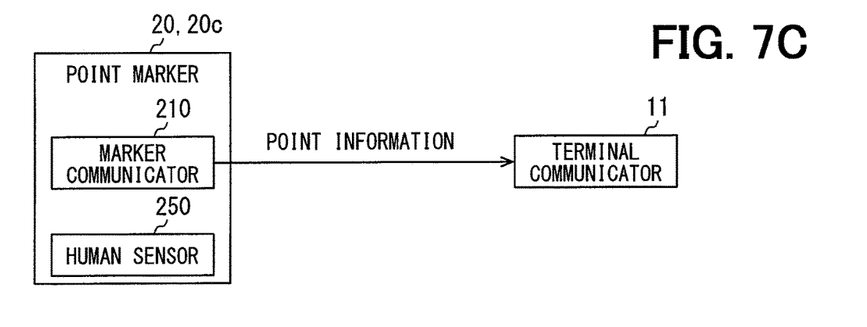
FIG. 7C is a diagram explaining a transmission mode of point information based on a detection result of a human sensor according to another embodiment.

(3A) Although a transmission wave representing point information is always transmitted from a point marker 20 (refer to FIG. 7A) in each of the above embodiments, this transmission manner of the transmission wave is not limiting. As shown in FIG. 7B, a point marker 20b may be configured so that a transmission wave representing point information may be transmitted from a marker communicator 211 when a request signal from a terminal communicator 11 installed in a portable terminal 10 is received by the marker communicator 211. Alternatively, as shown in FIG. 7C, a point marker 20c may be configured so that a transmission wave representing point information may be transmitted when a human sensor 250 installed in the point marker 20c detects that a person exists within the transmission range of a marker communicator 210. In either of the configurations of the point marker 20b and the point marker 20c, power consumption can be reduced.

(3B) In each of the above embodiments, a portable terminal 10 (controller 15) is configured so as to repeatedly carry out a positioning process while the portable terminal 10 is power on. Alternatively, a portable terminal 10 (controller 15) may be configured so as to start a positioning process upon receipt of a transmission wave from a point marker 20 installed at the entrance to the interior of a building (a point marker 20a in FIG. 2). Alternatively, portable terminal 10 (controller 15) may be configured so as to: overwrite the current position of the portable terminal 10 based on a received GPS signal as a portable coordinate in a RAM 53 while the GPS signal is receivable by a GPS receiver 31; and start a positioning process upon non-receipt of the GPS signal by the GPS receiver 31, for example.

(3C) Although an example of transmitting and receiving point information between a point marker 20 and a portable terminal 10 through a wireless wave in a positioning system 1 or 2 is shown in each of the above embodiments, this communication manner is not limiting. For example, a positioning system may be configured so as to transmit and receive point information through a sonic wave.

(3D) Although the absolute coordinate of a point marker 20 is stored as position information in each of the above embodiments, this position indication information is not limiting. For example, a relative coordinate obtained by setting an entrance of a building as a reference point may be stored as position information. Alternatively, it is also possible to transmit position information as a simple number, retain a conversion table in a wireless positioning terminal, and convert the simple number to the position information. On that occasion, the conversion table may be retained in the wireless positioning terminal or may be received from a server each time.

(3E) As is well known in the art, generally in map data used in a navigation device mounted on a vehicle, a road on a map is represented in units of link and a road network is represented by links and nodes each of which is a connection point of links. When a network of indoor aisles is represented by links and nodes each being a connection point of links in an indoor map stored in a map DB 12 in each of the above embodiments similarly to a road network for example, the position of a portable terminal 10 may be identified by carrying out map matching with the information of the network. This makes it possible to identify the position of a portable terminal 10 in an interior with a higher degree of accuracy.

(3F) Although position information and magnetic correction information are included in point information in the above embodiments, the information included in the point information is not limited to the information in the above embodiments. For example, information representing the height of an installation position of a point marker 20 may be included in the point information. The information representing a height may be floor information in the interior of a building like a basement, a first floor, a second floor, and other floors or may be information represented by an altitude, a ground height, or the like. Alternatively, information representing the accuracy of an installation position represented by position information may be included in the point information. In the case of the above embodiments, information representing a range transmission of a point marker 20, information represented like ±d (m) for example, may be used as information representing the accuracy of an installation position. Alternatively, information representing the accuracy of magnetic correction information may be included in the point information.

Figure 6:
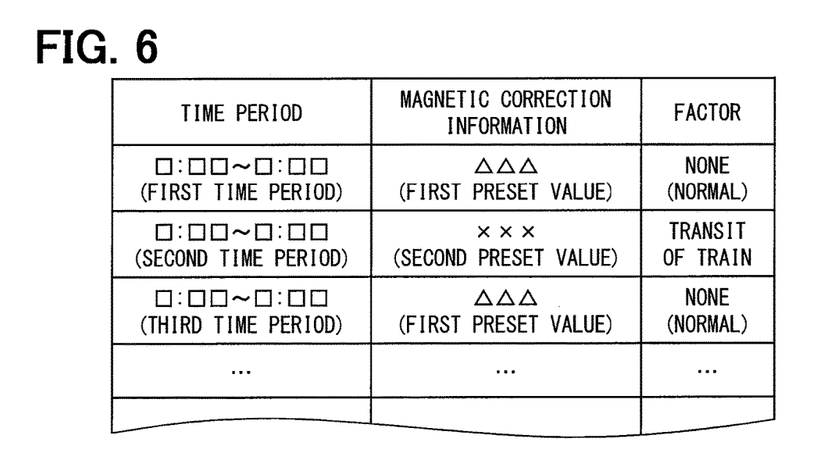
FIG. 6 is diagram showing an example of a table representing magnetic correction information.

(3G) Although a point marker 20 transmits either a first predetermined value or a second predetermined value as magnetic correction information according to a timing of changing a geomagnetic bias at an installation position in the above second embodiment, this transmission manner is not limiting. For example, a point marker 20 may transmit entire information to correct a geomagnetic bias according to a timing of changing a geomagnetic bias at an installation position as shown in the table of FIG. 6 as an example, namely the table itself of FIG. 6, as magnetic correction information. On this occasion, by configuring a portable terminal 10 so as to correct an orientation by using either the first predetermined value or the second predetermined value as magnetic correction information in accordance with the time of receiving the magnetic correction information, effects similar to the above second embodiment are exhibited. On this occasion further, the point marker 20 is not required to have a timer 240 and hence the configuration can be simplified. Although a single second predetermined value is set in the case where an electric train passes through in the above embodiment, this is not limiting and various kinds of second predetermined values may be set for respective factors of changing geomagnetism such as the case where an electric train passes through or the case where an airplane flies over.

(3H) Although a point marker 20 or 21 is installed in the interior of a building in the above embodiments, the point marker 20 or 21 is not limited to the case and may be installed underground, outdoors, or the like.

(3I) It is possible to: disperse a function of one constituent component in each of the above embodiments into a plurality of constituent components; or integrate a plurality of constituent components having functions into one constituent component having the functions. Further, at least a part of a configuration in each of the above embodiments may be replaced with another configuration having a similar function. Furthermore, a part of a configuration in each of the above embodiments may appropriately be omitted. In addition, at least a part of a configuration in each of the above embodiments may be added to or replaced with a configuration in another embodiment.

(3J) The embodiments are not only a portable terminal 10 (controller 15), a point marker 20, a point marker 21, a positioning system 1, and a positioning system 2, but also a program for functioning the controller 15 in the portable terminal 10, a medium storing the program, a positioning method, and others.

What is claimed is:

1. A wireless positioning system comprising
a point information transmitter and
a wireless positioning terminal carried by a user to communicate wirelessly with the point information transmitter,
wherein:
the point information transmitter is installed at a predetermined installation position and transmits point information including at least magnetic correction information to correct a geomagnetic bias at the installation position;
the wireless positioning terminal includes:
an orientation detector to detect an orientation based on geomagnetism; and
a correction section to correct the orientation detected by the orientation detector based on the magnetic correction information included in the point information received from the point information transmitter; and
the magnetic correction information is information to correct the geomagnetic bias in accordance with an available timing of changing a geomagnetic bias at the installation position when the timing is available.

2. The wireless positioning system according to claim 1, wherein
first magnetic correction information is the magnetic correction information for a time when the geomagnetic bias does not change;
second magnetic correction information is the magnetic correction information for a time when the geomagnetic bias changes; and
the point information transmitter transmits either the first magnetic correction information or the second magnetic correction information in accordance with the timing.

3. The wireless positioning system according to claim 1, wherein:
the wireless positioning terminal transmits a request signal to request to transmit the point information; and
the point information transmitter transmits the point information upon receipt of the request signal.

4. The wireless positioning system according to claim 1, wherein:
the point information includes position information to identify the installation position; and
the wireless positioning terminal includes a position identification section to identify the installation position identified by the position information included in the point information received from the point information transmitter as the position of the wireless positioning terminal.

5. A point information transmitter communicating wirelessly with a wireless positioning terminal carried by a user,
wherein the wireless positioning terminal includes an orientation detector to detect an orientation based on geomagnetism and a correction section to correct the orientation detected by the orientation detector based on magnetic correction information included in point information received from the point information transmitter,
wherein the point information transmitter is installed at a predetermined installation position and transmits the point information including at least the magnetic correction information to correct a geomagnetic bias at the installation position, and wherein the magnetic correction information is information to correct the geomagnetic bias in accordance with an available timing of changing a geomagnetic bias at the installation position when the timing is available.

6. The point information transmitter according to claim 5, wherein first magnetic correction information is the magnetic correction information for a time when the geomagnetic bias does not change;

second magnetic correction information is the magnetic correction information for a time when the geomagnetic bias changes; and the point information transmitter transmits either the first magnetic correction information or the second magnetic correction information in accordance with the timing.

7. The point information transmitter according to claim 5, wherein:

the wireless positioning terminal transmits a request signal to request to transmit the point information; and the point information transmitter transmits the point information upon receipt of the request signal.

8. The point information transmitter according to claim 5, wherein:

the point information includes position information to identify the installation position; and the wireless positioning terminal includes a position identification section to identify the installation position identified by the position information included in the point information received from the point information transmitter as the position of the wireless positioning terminal.

* * * * *